(12) United States Patent
Wieczorek (10) Patent No.: US 8,277,655 B2
(45) Date of Patent: Oct. 2, 2012

(54) FLUID FILTERING WITH CONTAMINANT REMOVAL

(75) Inventor: Mark T. Wieczorek, Cookville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1324 days.

(21) Appl. No.: 11/424,998

(22) Filed: Jun. 19, 2006

(65) Prior Publication Data

US 2006/0283815 A1 Dec. 21, 2006

Related U.S. Application Data

(60) Provisional application No. 60/691,425, filed on Jun. 17, 2005.

(51) Int. Cl.
*B01D 17/02* (2006.01)

(52) U.S. Cl. .......... 210/304; 210/306; 210/456

(58) Field of Classification Search ........ 210/106, 210/111, 304, 305, 306, DIG. 5
See application file for complete search history.

(56) References Cited

U.S. PATENT DOCUMENTS

| | | | | |
|---|---|---|---|---|
| 2,837,214 A | * | 6/1958 | Walter | 210/300 |
| 3,245,541 A | * | 4/1966 | Silverwater | 210/307 |
| 3,272,336 A | * | 9/1966 | Humbert, Jr. | 210/132 |
| 4,464,263 A | * | 8/1984 | Brownell | 210/484 |
| 4,707,165 A | * | 11/1987 | Tauber et al. | 96/174 |
| 4,810,387 A | * | 3/1989 | Sasaki et al. | 210/634 |
| 5,049,263 A | * | 9/1991 | Hoffman et al. | 210/86 |
| 5,174,907 A | * | 12/1992 | Chown et al. | 210/791 |
| 5,580,453 A | * | 12/1996 | Nurse, Jr. | 210/323.2 |
| 5,622,623 A | | 4/1997 | Stone | |
| 5,916,442 A | * | 6/1999 | Goodrich | 210/311 |
| 6,203,698 B1 | * | 3/2001 | Goodrich | 210/311 |
| 6,319,403 B1 | * | 11/2001 | Meyers | 210/336 |
| 6,328,889 B1 | * | 12/2001 | Bradford | 210/308 |
| 6,508,418 B1 | | 1/2003 | Fochtman et al. | |
| 6,540,909 B2 | * | 4/2003 | Smith et al. | 210/95 |
| 6,540,926 B2 | * | 4/2003 | Goodrich | 210/801 |
| 6,610,198 B1 | * | 8/2003 | Jiang et al. | 210/86 |
| 6,641,742 B2 | * | 11/2003 | Prater et al. | 210/767 |
| 6,758,980 B2 | * | 7/2004 | Prater et al. | 210/767 |
| 6,919,034 B2 | * | 7/2005 | Kozak, III | 210/799 |
| 7,094,344 B2 | * | 8/2006 | Shirakawa et al. | 210/301 |
| 7,527,739 B2 | * | 5/2009 | Jiang et al. | 210/702 |
| 2002/0125178 A1 | * | 9/2002 | Smith et al. | 210/90 |

(Continued)

OTHER PUBLICATIONS

International Search Report for international application No. PCT/US2006/023677, dated Sep. 27, 2007 (1 page).

(Continued)

*Primary Examiner* — Terry Cecil (74) *Attorney, Agent, or Firm* — Hamre, Schumann, Mueller & Larson, P.C.

(57) ABSTRACT

An apparatus, system, and method for fluid filtering with contaminant removal, such as removing water from the surface of a top loading-type fuel filter element, includes a housing containing a cavity, a fluid flow inlet leading into the cavity, a filter element disposed in the cavity, and a flow director configured to direct the flow of fluid against the filter element such that contaminant collected on the surface of the filter element is sloughed off. The flow director may be configured to direct the fluid flow at least partially parallel to the filter element. The flow director may further be configured as one or more holes in a filter element housing disposed around the filter element.

23 Claims, 12 Drawing Sheets

U.S. PATENT DOCUMENTS

| | | | |
|---|---|---|---|
| 2003/0015465 A1* | 1/2003 | Fick et al. | 210/234 |
| 2003/0102268 A1* | 6/2003 | Prater et al. | 210/741 |
| 2004/0020871 A1* | 2/2004 | Hampton et al. | 210/799 |
| 2004/0094459 A1* | 5/2004 | Prater et al. | 210/90 |
| 2005/0103700 A1* | 5/2005 | Shirakawa et al. | 210/301 |
| 2006/0283815 A1* | 12/2006 | Wieczorek | 210/791 |
| 2008/0035121 A1* | 2/2008 | Wieczorek | 123/516 |

OTHER PUBLICATIONS

Written Opinion of the International Searching Authority for international application No. PCT/US2006/023677, dated Sep. 27, 2007 (5 pages).

* cited by examiner

FLUID FILTERING WITH CONTAMINANT REMOVAL

PRIORITY APPLICATIONS

This application claims priority to provisional patent application 60/691,425, "Apparatus, System, and Method for Fuel Water Separator," filed 17 Jun. 2005, incorporated herein by reference.

BACKGROUND OF THE INVENTION

1. Field of the Invention

This invention relates to fluid filters, and more particularly to fuel-water separators.

2. Description of the Related Art

Various types of fluid filters currently exist in the art, including filters that have the capability of separating water and/or other contaminants from diesel or other engine fuel before its use in the engine. The basic operation of such filters is to force the fluid through a filter medium or element, with any undesired contaminants remaining on the surface of the filter element. Complications arise with the buildup of contaminants on the filter element surface, clogging or blocking the flow of fluid, necessitating periodic replacement of the element. In the case of spin-on filters, this is generally done by replacing the entire filter apparatus. In the case of top-loading filters, this is generally done by removing the lid or top of the outer housing, replacing the filter element inside, and replacing the top.

Fuel filters that separate out water from the fuel, usually top loading-type filters, generally have an accretion of water on the filter element surface. The water is typically removed from the filter surface by the force of gravity: When enough water accumulates in the same region of the filter element, it coalesces, forming droplets or beads that are large enough and heavy enough to drop into a sump beneath the filter element.

A problem with fuel-water separators is that the longer the filter element is in contact with water that has not yet coalesced sufficiently to drop into the sump, the less hydrophobic the element becomes. Thus the water begins to wick through it and work its way downstream, compromising the performance of the filter. It is therefore advantageous to remove the water from the element as quickly as possible.

Other things being equal, filter element size typically varies with the rate of fuel flow needing to be filtered. More fuel flow requires a larger filter element in order to maintain the same level of performance. Light-duty automotive applications might require a 1.5-liter-per-minute (lpm) flow rate, with a correspondingly small filter element, with heavy-duty, high-horsepower applications having flow rates of 15 lpm or higher, with a correspondingly large filter element. If the filter element is appropriately sized for the fuel flow rate, the fuel-water separator will remove enough water from the fuel to meet the design requirements of the separator.

Even though flow rates are becoming higher in some systems, however, space restrictions or other considerations sometimes make the employment of a larger fuel-water separator impractical. Thus the fuel filter package size cannot always be increased proportionately with the increased flow rate, translating to a drop in filter performance.

SUMMARY OF THE INVENTION

The present invention has been developed in response to the present state of the art, and in particular, in response to the problems and needs in the art that have not yet been fully solved by currently available fluid filters. Accordingly, the present invention has been developed to provide an apparatus, system, and method for fluid filtering that overcome many or all shortcomings in the art.

In one aspect of the invention, a filter apparatus includes a housing containing a cavity and an inlet disposed in the housing, with the inlet designed to introduce a flow of fluid containing a contaminant into the cavity. The cavity contains a filter element, and the filter element is designed to allow the fluid to flow through the filter element while disallowing the contaminant from flowing through the filter element, with the result that the contaminant remains on the filter element. A flow director is provided to direct the flow of fluid to hydraulically remove the contaminant from the filter element. In one embodiment, the filter apparatus comprises a top-loading fuel filter designed to separate water from fuel, and the flow director is designed to direct the flow of fluid at least partially parallel to a surface of the filter element. In a further embodiment, an element housing is disposed in sealing engagement between the filter element and the housing, with the flow director comprising a hole in the element housing.

In a further aspect of the invention, a fluid filtering method includes introducing a fluid flow containing a contaminant into a cavity, directing the fluid flow against a filter element contained in the cavity such that the fluid flows through the filter element without the contaminant, the contaminant remaining on the filter element. The hydraulic force of the fluid flow is then used to slough the contaminant off the filter element. In one embodiment, a flow director directs the fluid flow at least partially parallel to a surface of the filter element. In a further embodiment, the fluid flow is directed through a hole in an element housing, with the hole disposed at or near the top of the filter element.

In a further aspect of the invention, a fuel filter system includes a housing, a cavity disposed within the housing, and an inlet disposed in the housing. The inlet is designed to supply a flow of fuel containing a contaminant into the cavity. A cylindrical filter element is disposed within the cavity. The filter element is designed to filter the fuel flowing from the inlet such that the fuel flows through the filter element and the contaminant remains on a surface of the filter element. A cylindrical element housing is disposed over the filter element such that an annular space is created between the filter element and the element housing. A hole is disposed in the filter housing. The hole is designed to direct the flow of fuel against and at least partially parallel to the filter element surface such that the contaminant is sloughed off the filter element surface.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
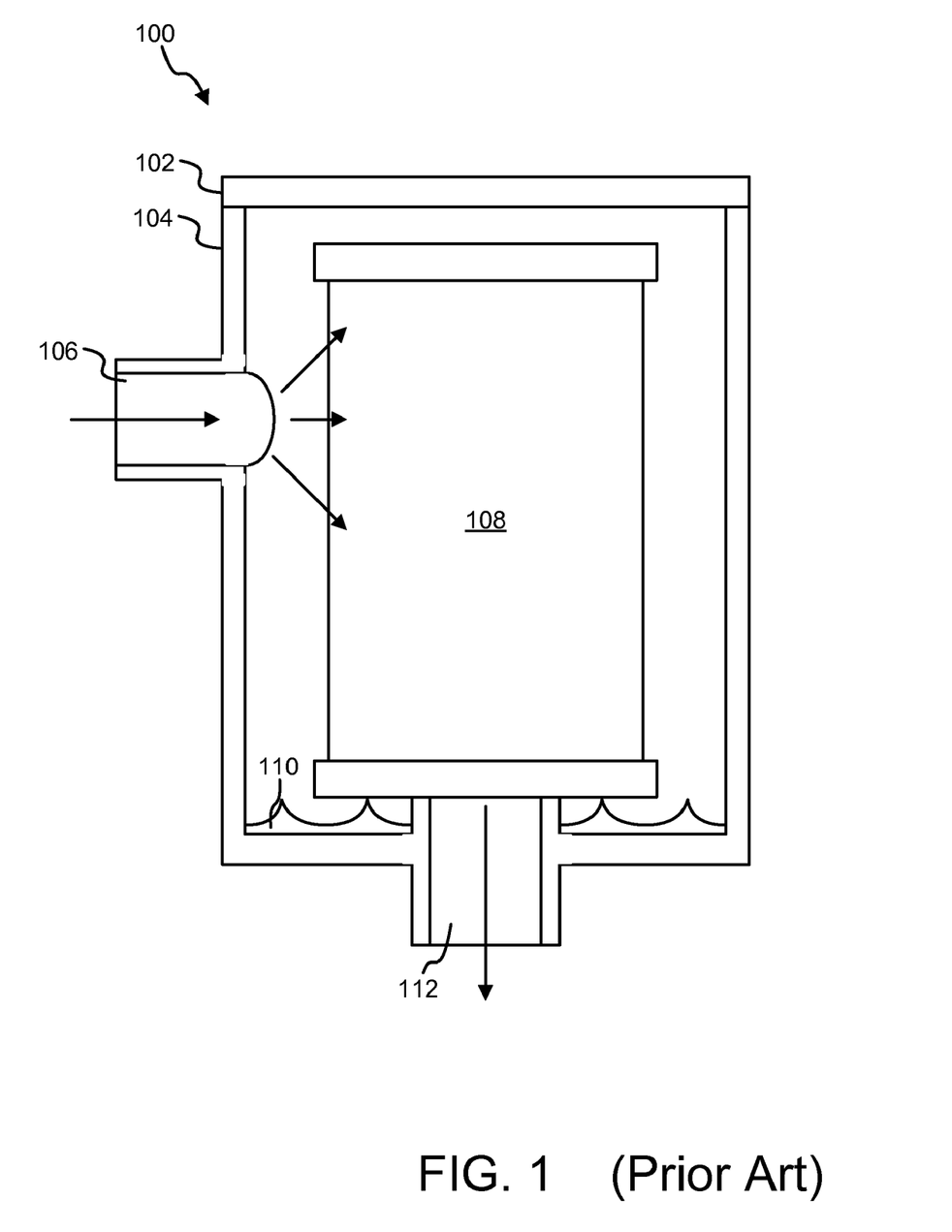
FIG. 1 is a cutaway front view of a conventional fuel filter having fuel-water separation capability.

FIG. 1 illustrates a conventional top-loading fuel filter including fuel-water separation capability 100 including a main housing lid 102, a main housing 104, a fuel inlet 106, a filter media cartridge or element 108, a sump 110, and a fuel outlet 112. Including other possible functions, the filter or fuel-water separator 100 removes water from fuel to improve the performance and longevity of engines. The main housing 104 and filter element 108 are generally cylindrical in one embodiment.

The embodiment shown is that of a fuel-water separator; the scope of the invention also includes other types of filters that have contaminants collect on the surface of the filter element in the course of operation. The contaminants may be particulate matter, organic substances, or anything else that tends to accumulate on the filter element and which should be removed for increased filter performance. The characteristics of the different contaminants and the difficulty of removing them from the filter element will vary depending on the specific application, as will be apparent to those skilled in the art. The invention's scope also includes filters used with other fluids such as water, hydraulic fluid, oil, or other fluid containing a contaminant.

The housing lid 102 attaches to the main housing 104 and creates a chamber for fuel flow within the main housing 104. The housing lid 102 may attach to the main housing 104 by a screw thread, by a latch, by a clip, a plurality of screws, a plurality of bolts, or other similar devices. The housing lid 102 may be removed from the main housing 104 to allow servicing of the fuel-water separator 100, such as replacement of the filter element 108.

The main housing 104 defines a chamber or cavity for fuel flow and accommodates a fuel inlet 106, the filter media cartridge 108, a sump 110, and a fuel outlet 112. A common application of a conventional fuel-water separator 100 includes fuel flow (indicated in the drawings by arrows) entering the main housing through the fuel inlet 106. Once the fuel enters the main housing 102, the fuel disperses around and passes through the filter element 108. The filtered fuel then exits the fuel-water separator 100 through the fuel outlet 112.

As the fuel passes through the filter element 108, water present in the fuel is deposited on the filter media cartridge 108. As more fuel passes through the separator 100 and more water is separated from the fuel, the water deposited on the filter element 108 coalesces and forms beads or droplets through the action of surface tension in the water. As these beads of water grow, their weight causes them to drop to the bottom of the main housing 104 where they collect in the sump 110. The collected water is periodically drained from the sump 110.

Figure 2:
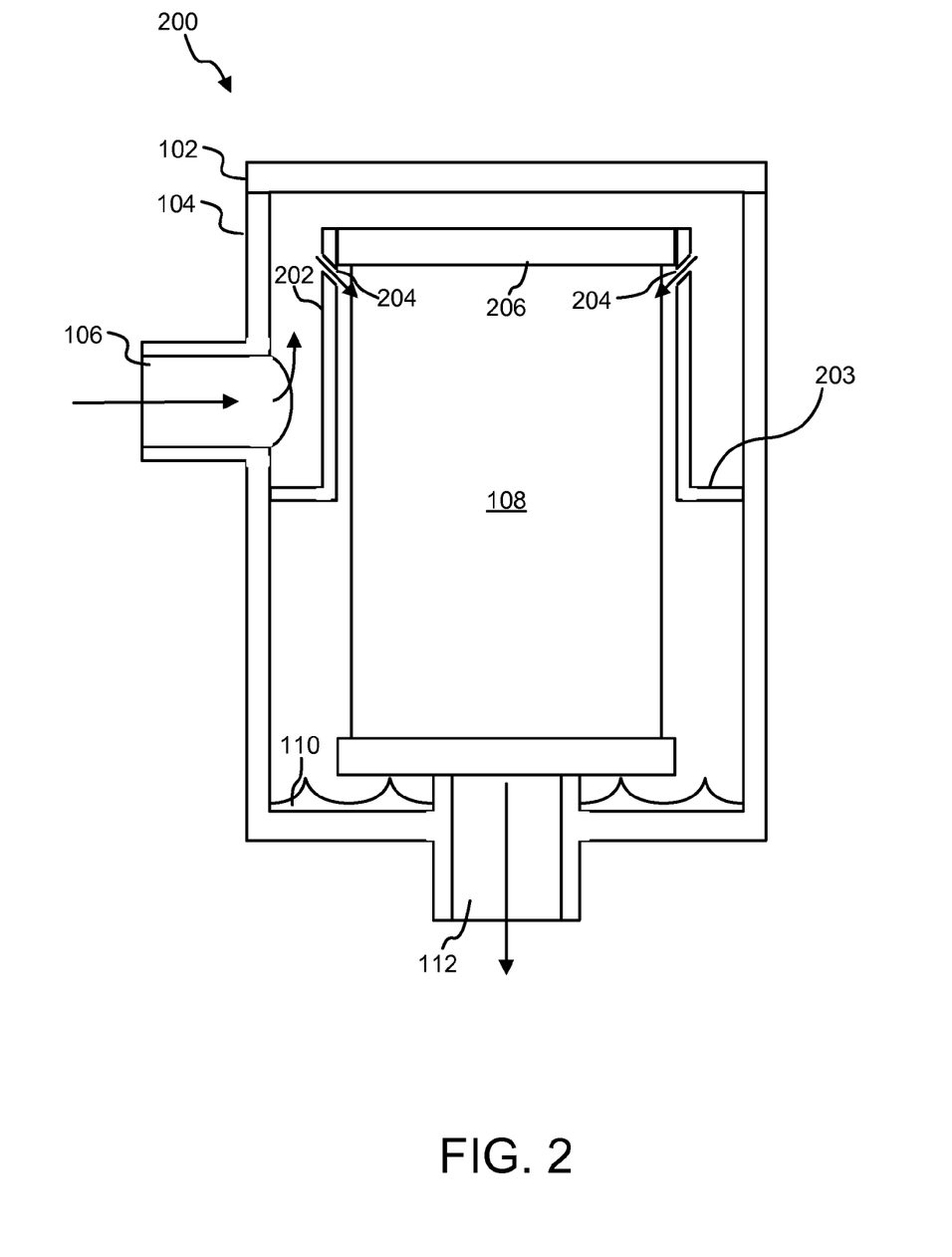
FIG. 2 is a cutaway front view of an embodiment of a fuel-water separator according to the present invention.

FIG. 2 illustrates an embodiment of a fuel-water separator 200 according to the present invention. The fuel-water separator 200 includes a housing lid 102, a main housing 104, a fuel inlet 106, a filter element housing 202, a filter media cartridge or element 108, a sump 110, and a fuel outlet 112. In this embodiment, the housing lid 102, main housing 104, fuel inlet 106, filter element 108, sump 110, and fuel outlet 112 are configured in a manner similar to like-numbered components in FIG. 1. The fuel-water separator 200 removes water from fuel.

In the embodiment shown, the filter element housing 202 is a generally cylindrical or annular structure that alters the path of the fuel entering the main housing 104 and directs the fuel as it approaches the filter element 108. The element housing 202 may be made from any rigid, impermeable material including plastic, metal, cellulose, or paper. A flange 203 extends from the bottom of the element housing 202 and seals to the main housing 104 by a weld, glue, or the like. Alternatively, the element housing 202 may be formed integral to the main housing 104. The flange 203 prevents unfiltered fuel from going through the filter element 108 by any means other than through holes 204, as further described below.

Near the top of the element housing 202, one or more holes 204 through the element housing 202 provide a pathway for fuel to approach the filter element 108. The holes 204 act as a flow director, directing the flow of the fuel. Other embodiments of flow directors include shunts, grooves, tunnels, slots, or other apparatuses configured to direct the flow. In one embodiment, the holes 204 are arranged on the element housing 202 such that the fuel is uniformly distributed around the filter element 108 as it passes through the holes 204. In one embodiment, the holes 204 are angled such that as fuel passes through the holes 204, it travels primarily in a direction at least partially parallel to the surface of the filter element 108 as it approaches the filter element 108. In the embodiment shown, with the filter element oriented vertically, the holes 204 cause the fuel to travel primarily in a direction with a downward component, downward being parallel to the filter element surface.

The holes 204 may comprise a single channel or a plurality of apertures formed in the element housing 202, depending on the needs of the particular application.

As will be apparent to those skilled in the art in light of this disclosure, a variety of types and configurations of holes 204 may be utilized without departing from the scope of the present invention. In one embodiment, the holes 204 may be slots formed in the element housing 202. In another embodiment, the holes 204 may be holes drilled or punched in the element housing 202. In another embodiment, the holes 204 may be distributed vertically along the element housing 202. In another embodiment, the holes 204 may comprise a single annular gap between the element housing 202 and the filter element 108.

In the embodiment shown, the element housing 202 mates with an endcap 206 of the filter element 108. When a filter element or cartridge 108 is placed in the chamber formed by the main housing 104, the cartridge 108 slides through the element housing 202. When the cartridge 108 seats in the main housing 104, the endcap 206 mates with the element housing 202. The interface between the element housing 202 and the endcap 206 may be impermeable, or alternatively it may allow fuel to pass between the element housing 202 and the endcap 206.

The directed flow of fuel as it travels through the holes 204 and approaches the filter element 108 improves the efficiency of the fuel-water separator 200. The uniform distribution of fuel flow around the filter element 108 promotes uniform and efficient filtration. Additionally, the downward or parallel component of the flow of fuel tends to slough accumulated water off the filter element 108 and into the sump 110. As discussed above, less water on the filter element 108 leads to better and more efficient performance of the separator 200, and allows for a smaller filter element 108 and/or a higher fuel flow rate.

The invention may be used in a variety of fluid filter types without departing from its scope, including spin-on, top-loading, and other filter types.

Figure 3:
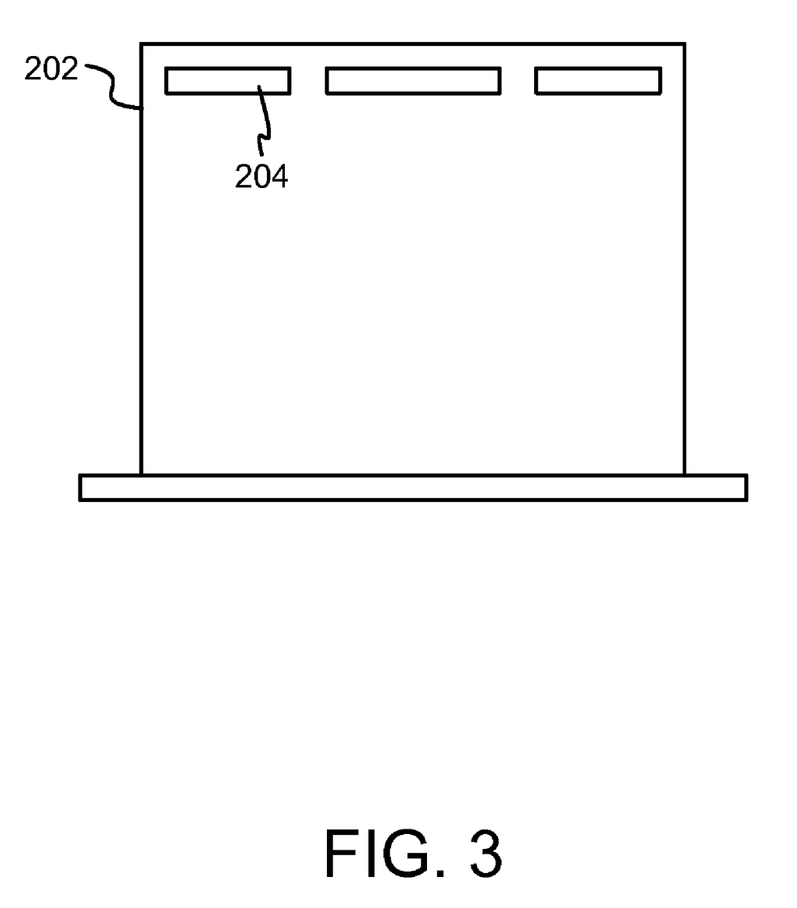
FIG. 3 is a front view of an embodiment of a filter element housing according to the present invention.

FIG. 3 illustrates a front view of one embodiment of an element housing 202 according to the present invention. The depicted element housing 202 is an annular structure, or cylindrical structure with open ends, that directs fuel flow through holes 204 when positioned around a filter element in a fuel-water separator (not shown in FIG. 3).

As stated above, the element housing 202 may be made from any sufficiently rigid and impermeable material, such as plastic, steel, aluminum, cellulose, paper, cardboard, or the like. In this embodiment, the holes 204, which provide a path for the flow of fuel toward a filter element, are slots distributed around the perimeter of the upper portion of the element housing 202. Alternatively, the holes 204 may be distributed across the element housing 202 vertically or in some other pattern to create a desired flow path, according to the particular application.

Figure 4:
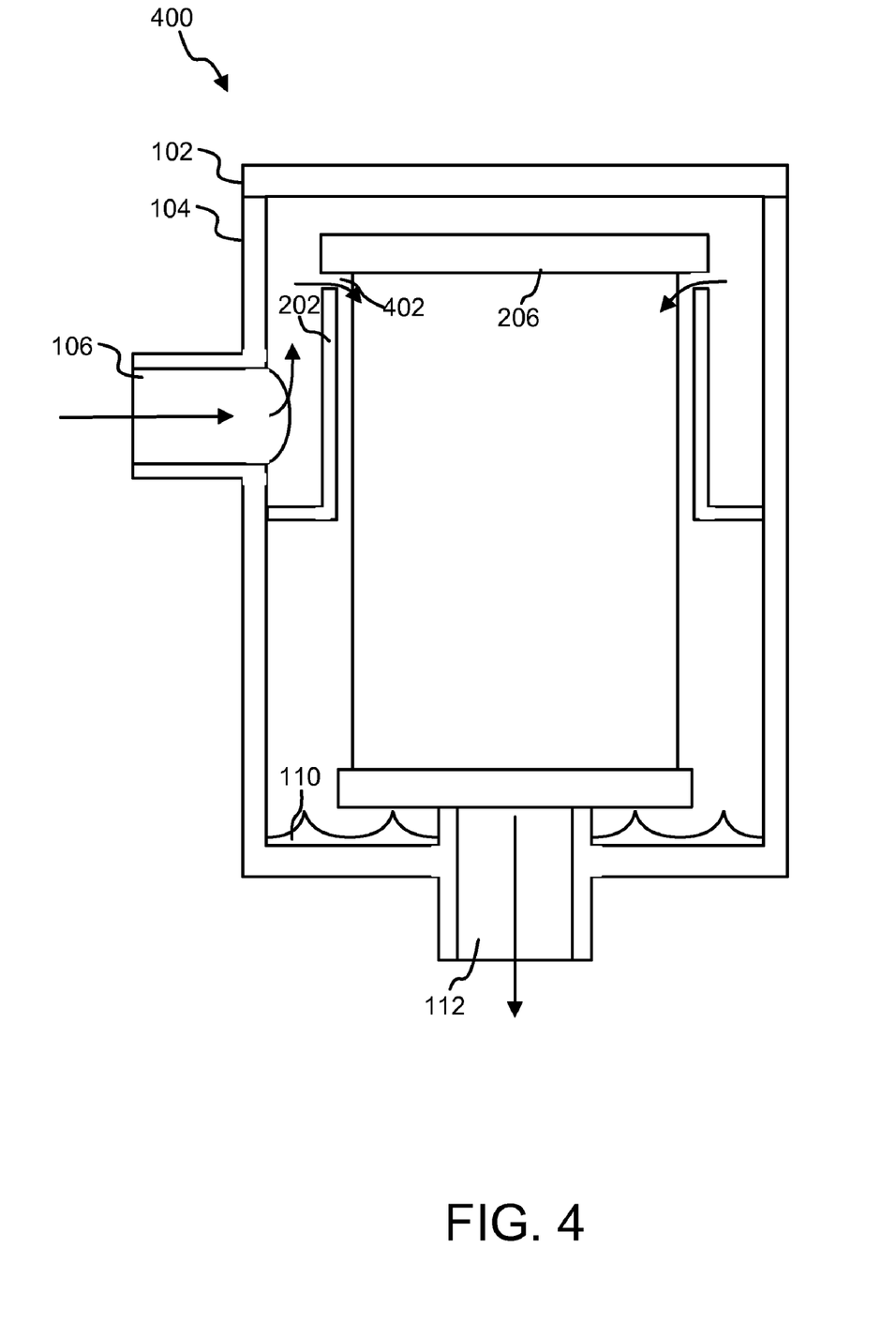
FIG. 4 is a cutaway front view of another embodiment of a fuel-water separator according to the present invention.

FIG. 4 illustrates another embodiment of a fuel-water separator 400 according to the present invention. The fuel-water separator 400 includes a housing lid 102, a main housing 104, a fuel inlet 106, an element housing 202, a filter media cartridge or element 108, a sump 110, and a fuel outlet 112. The housing lid 102, main housing 104, fuel inlet 106, filter element 108, sump 110, and fuel outlet 112 are configured in a manner similar to like-numbered components described above in relation to FIG. 1. The element housing 202 is configured in a manner similar to the like-numbered component in relation to FIG. 2. The fuel-water separator 400 removes water from fuel.

In this embodiment, the element housing 202 is connected to the housing 104 as in FIG. 2. The seated filter element 108 includes an endcap 206 that rests some distance above the element housing 202. The resulting annular gap 402 defines an orifice or hole through which fuel flows. The annular gap 402 may be sized such that fuel is uniformly distributed around the filter element 108 as it flows through the gap 402.

A variety of types and configurations of holes 204 formed between the element housing 202 and the endcap 206 may be used without departing from the scope of the present invention. In one embodiment, the holes 204 may be formed by crenels formed in the top of the element housing 202, with the top edge of the element housing 202 contacting the endcap 206 and the crenels providing an orifice for fuel flow. In another embodiment, the endcap 206 may be crenelated, with the outer edge of the endcap 206 contacting the element housing and the crenels in the endcap 206 providing an orifice for fuel flow.

In another embodiment, the element housing 202 may have a larger diameter than the endcap 206, the differences in diameter creating an annular gap that acts as an orifice 204 for fuel flow.

In another embodiment, if a pleated filter element is used the holes 204 may each correspond to pleat in the element, allowing for more efficient flow and removal of water from the element.

Figure 5:
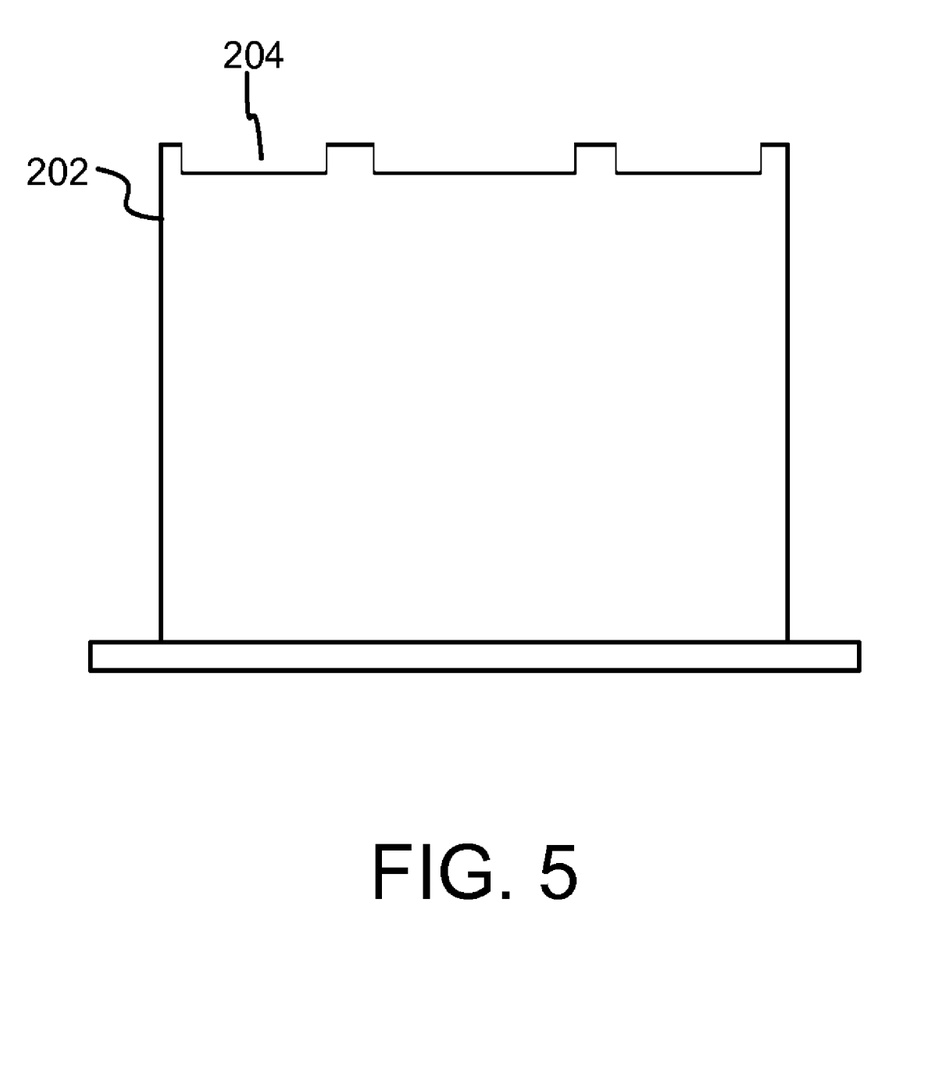
FIG. 5 is a front view of another embodiment of a filter element housing according to the present invention.

FIG. 5 shows a front view of an embodiment of an element housing 202 according to the present invention. The depicted element housing 202 is an annular structure (or a cylindrical structure with open ends) that directs fuel flow through holes 204 when positioned around a filter element in a fuel water separator (not shown in FIG. 5).

The element housing 202 may be made from any sufficiently rigid and impermeable material, such as plastic, steel, aluminum, cellulose, cardboard, paper, or the like. The holes 204 provide a path for the flow of fuel toward the filter element. The holes 204 may be formed by crenels distributed around the perimeter of the top of the element housing 202 and an endcap of a nested filter media cartridge, or by other means.

Figure 6:
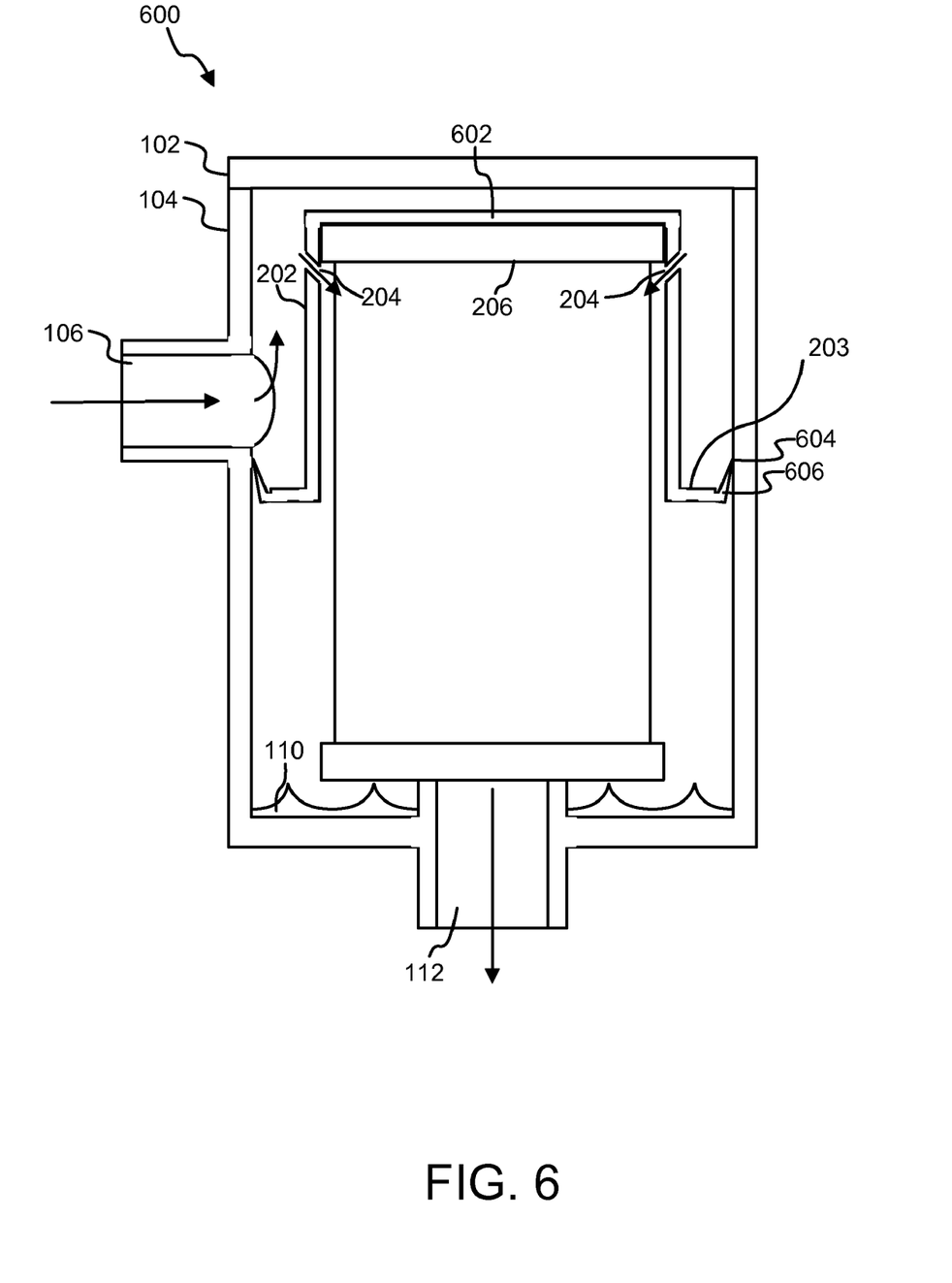
FIG. 6 is a cutaway front view of an embodiment of a fuel-water separator with a removable filter element housing according to the present invention.

FIG. 6 illustrates another embodiment of a fuel water separator 600 according to the present invention. The fuel water separator 600 includes a housing lid 102, a main housing 104, a fuel inlet 106, an element housing 202 with holes 204, a filter element 108, a sump 110, and a fuel outlet 112. The housing lid 102, main housing 104, fuel inlet 106, filter element 108, sump 110, and fuel outlet 112 are configured in a manner similar to like-numbered components described above in relation to FIG. 1.

In this embodiment, the element housing 202 is independent of the main housing 104 and may be removed from the fuel-water separator 600 during servicing. The element housing 202 may include a top surface 602, giving the element housing 202 an inverted cup shape. The element housing 202 may also include an interface 604 with the main housing 104 to restrict the flow of fuel around the element housing 202.

The element housing 202 may be attached to the end of the filter element 108.

In this embodiment, the interface 604 comprises a flexible lip 606 disposed on the flange 203 of the element housing 202. The flexible lip 606 flexes inward when the element housing 202 is inserted into the main housing 104. While the flexible lip 606 is flexed inward it exerts a pressure on the main housing 104 and restricts the flow of fuel between the flexible lip 606 and the main housing 104. As a result, fuel flow is diverted through the holes 204 and the efficiency of the fuel-water separator 600 is improved as described above.

Figure 7:
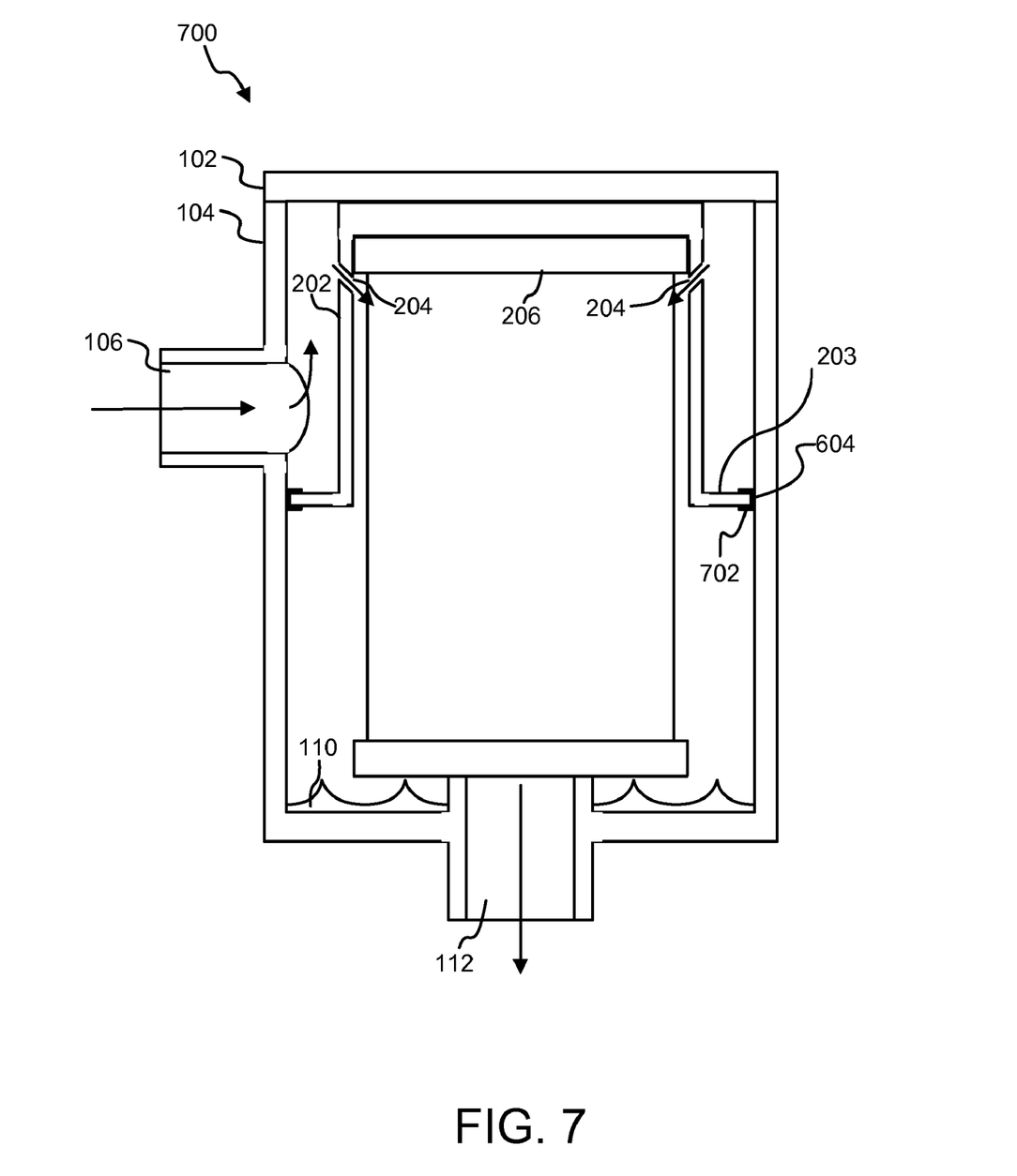
FIG. 7 is a cutaway front view of an embodiment of a fuel-water separator with a filter element housing attached to the main housing lid according to the present invention.

FIG. 7 illustrates another embodiment of a fuel-water separator 700 according to the present invention. The fuel-water separator 700 includes a housing lid 102, a main housing 104, a fuel inlet 106, an element housing 202 with holes 204 and an interface 604 with the main housing 104, a filter element 108, a sump 110, and a fuel outlet 112. The housing lid 102, housing 104, fuel inlet 106, filter media cartridge 108, sump 110, and fuel outlet 112 are configured in a manner similar to like-numbered components described above in relation to FIG. 1.

In one embodiment, the element housing 202 is attached to the housing lid 102. When the housing lid 102 is removed, the element housing 202 slides out of the main housing 104. When the housing lid 102 is attached to the main housing 104, the element housing 202 slides into the main housing 104 and around the filter element 108.

Various types of element housings affixed to the housing lid 102 may be utilized without departing from the scope of the present invention. For example, in one embodiment, the element housing 202 is integrated with and formed with the housing lid 102.

In the embodiment shown in FIG. 7, the interface 604 with the main housing 104 comprises a gasket 702 that is attached to the flange 203. The gasket 702 forms a seal between the element housing 202 and the main housing 102, restricting flow between the element housing 202 and the main housing 102. The gasket 702 may be formed from any flexible material including synthetic rubber, natural rubber, or plastic.

Various types of interfaces 604 are possible while remaining within the scope of the invention, such as a flexible lip, O-ring seal, or a close-tolerance fit.

Figure 8:
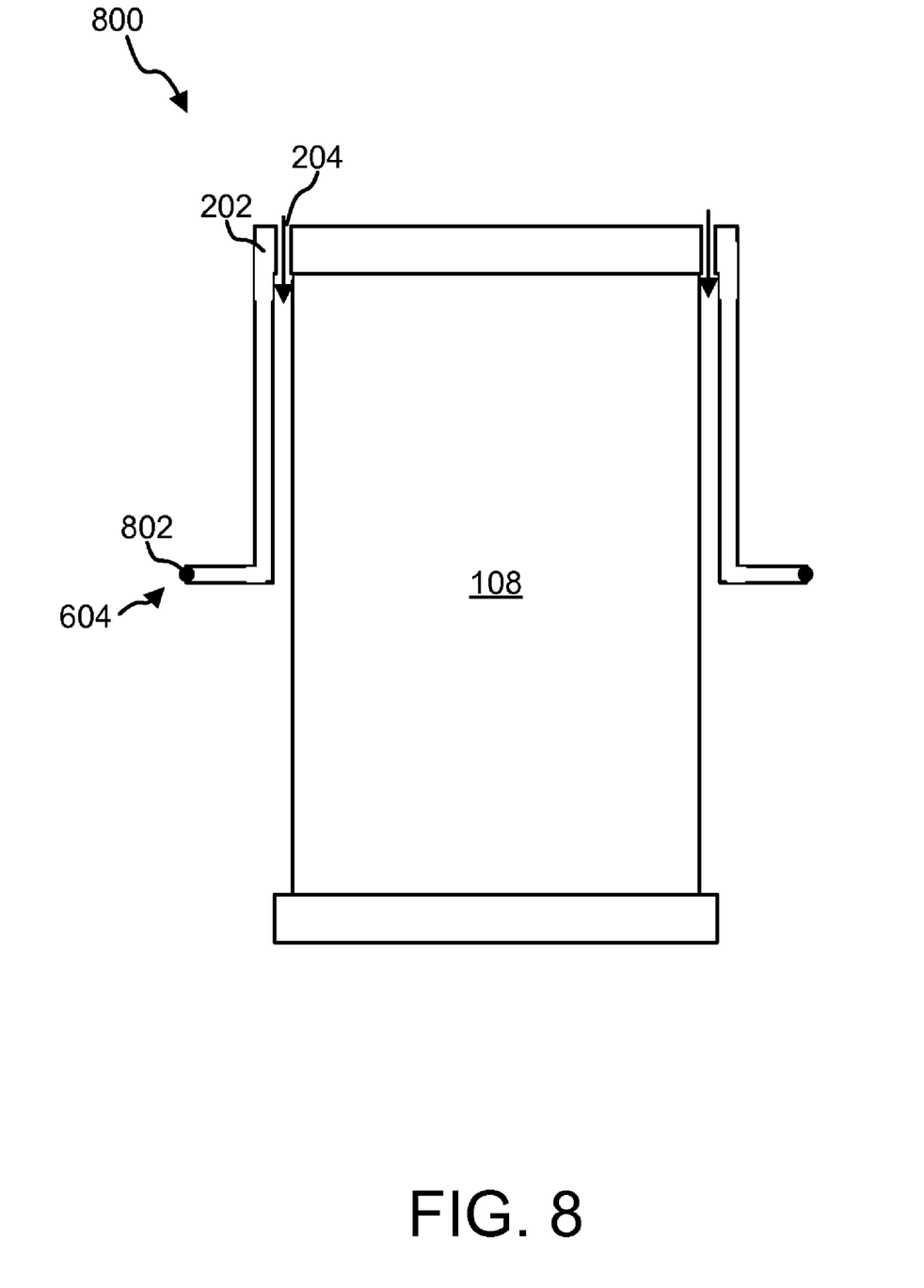
FIG. 8 is a cutaway front view of an embodiment of a filter element with a filter element housing integrated into the element endcap according to the present invention.

FIG. 8 illustrates an embodiment of a filter element assembly 800, including a filter element housing, according to the present invention. The assembly 800 includes a filter element 108, an element housing 202, holes 204, an interface 604 with a main housing (not shown), and an O-ring 802. The filter element 108 is preferably configured in a manner similar to the like-numbered component described above in relation to FIG. 1.

In the embodiment shown, the element housing 202 is integrated with the filter element 108 and forms an endcap for the element 108. The element housing 202 is configured to direct the flow of fuel when the assembly 800 is inserted into a housing (not shown). Fuel is directed through the holes 204 by the element housing 202. The fuel is uniformly distributed around the filter element 108 and directed primarily in a direction including a downward component by the holes 202. This directional flow is partially parallel to the surface of the filter element 108.

The holes 204 provide a pathway for fuel flow and are formed in the top portion of the element housing 202. Alternatively, the holes 204 may be formed in the sides of the element housing 202, or in both the sides and the top.

The interface 604 with the main housing includes an O-ring 802, which is configured to restrict the flow of fluid between the interface 604 and the main housing. The O-ring 802 may be made from any material that will adequately restrict fluid flow, including synthetic rubber, natural rubber, or plastic.

Figure 9:
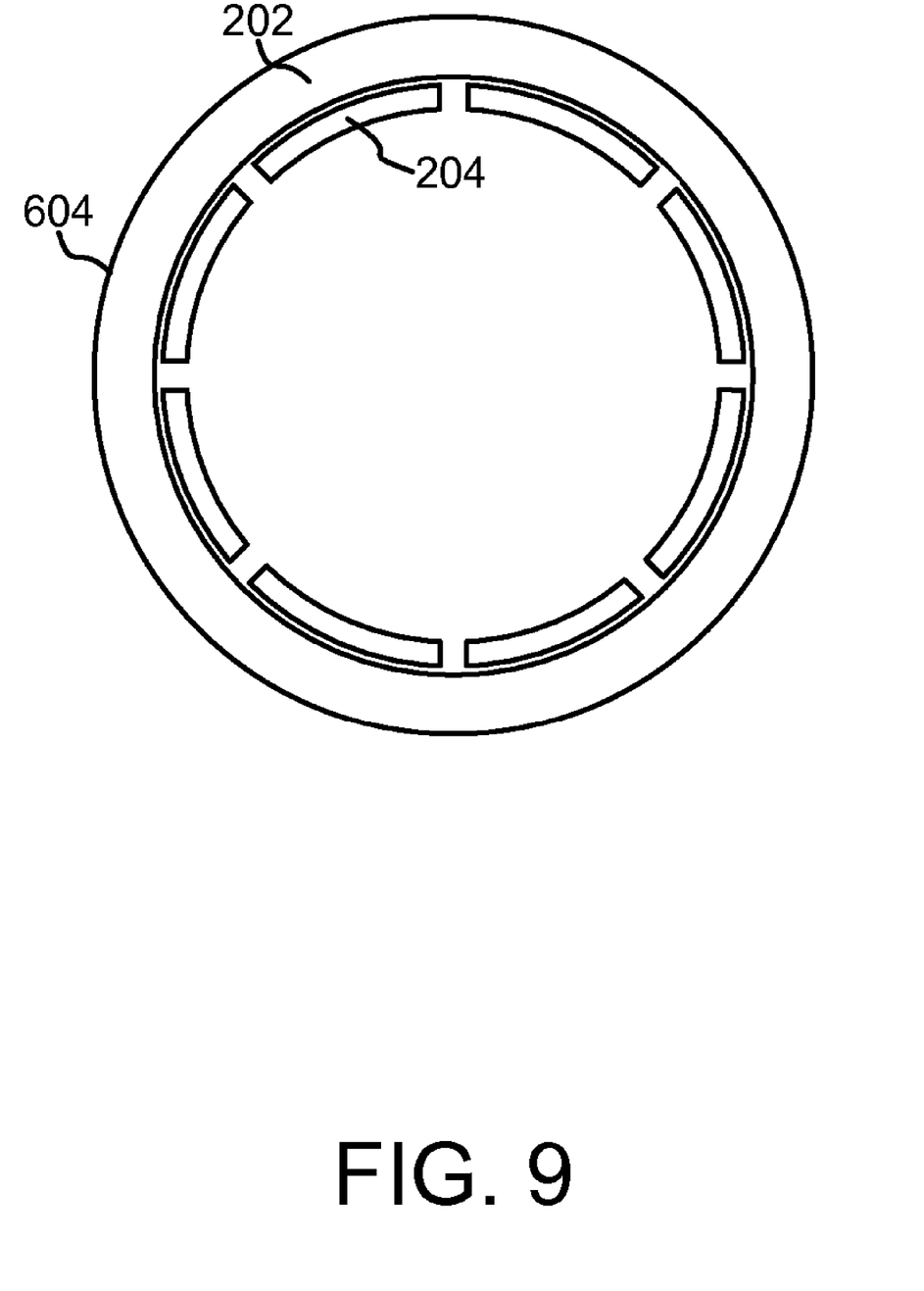
FIG. 9 is a top view of another embodiment of a filter element housing according to the present invention.

FIG. 9 illustrates a top view of the element housing 202 used in the assembly 800. The depicted element housing 202 includes holes 204 and an interface 604 with a main housing.

The holes 204 comprise slots formed in the element housing 202, uniformly arranged along an annular area of the top of the element housing 202. The holes 204 impart direction to the fluid flow in a fuel-water separator. In one embodiment, the holes may be molded into the element housing 202 when the element housing 202 is molded.

Figure 10:
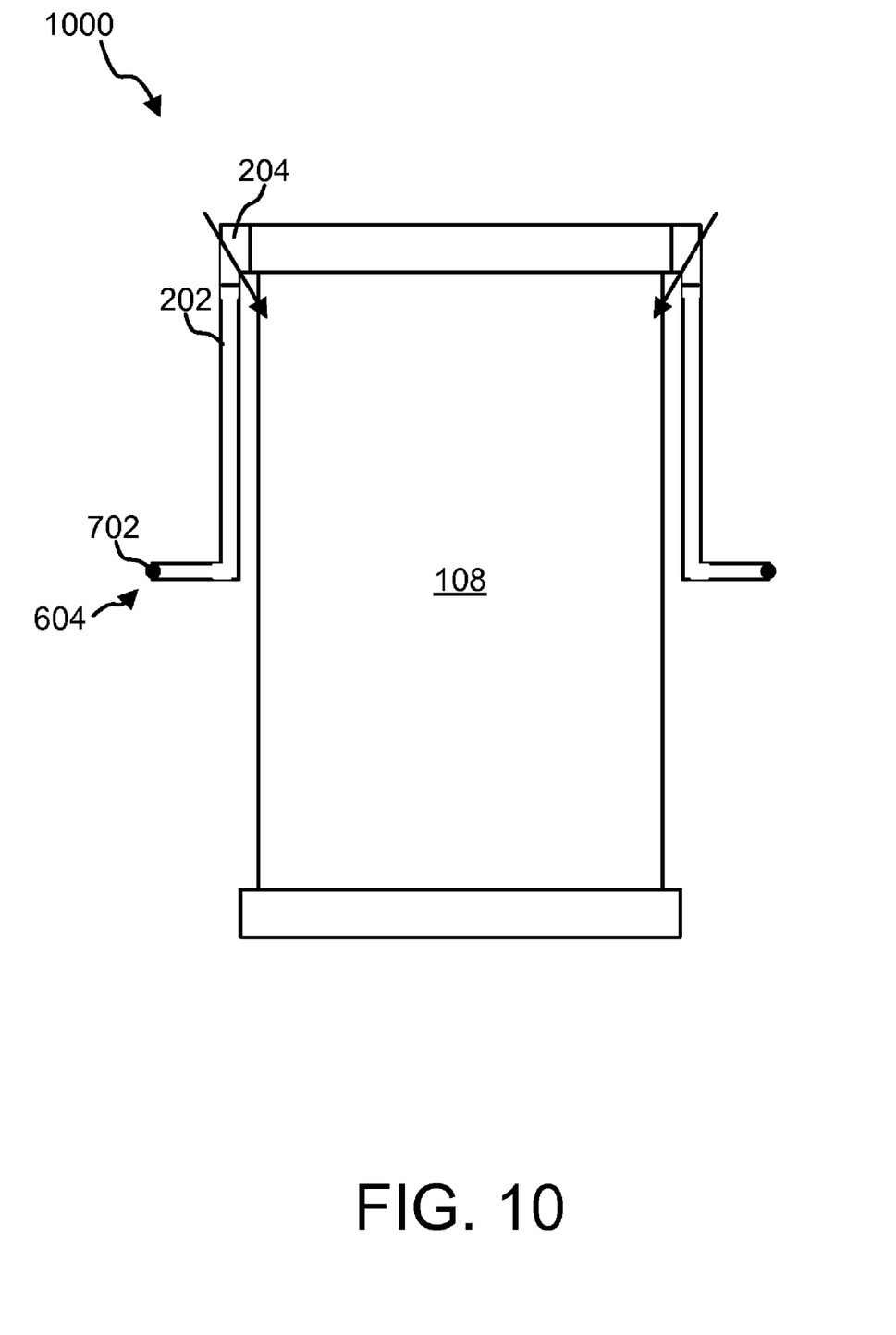
FIG. 10 is a cutaway front view of another embodiment of a filter element with a filter element housing integrated into the element endcap in accordance with the present invention.

FIG. 10 illustrates another embodiment of a filter element assembly 1000 according to the present invention. The assembly 1000 includes a filter element 108, a filter element housing 202, a hole or holes 204, an interface 604 with a main housing, and an O-ring 802. The filter element 108 is configured in a manner similar to the like-numbered component described above in relation to FIG. 1. The element housing 202, the orifices 204, and the interface with the housing 604 are configured in a manner similar to like numbered components in relation to FIG. 8.

The holes 204 are formed on the edge of the element housing 202 between its top and the side surfaces. The holes 204 may be cut or punched into the edge of the element housing 202. In a further embodiment, the holes 204 may be distributed across the element housing 202 with orifices in the top surface, sides, and edge.

Figure 11:
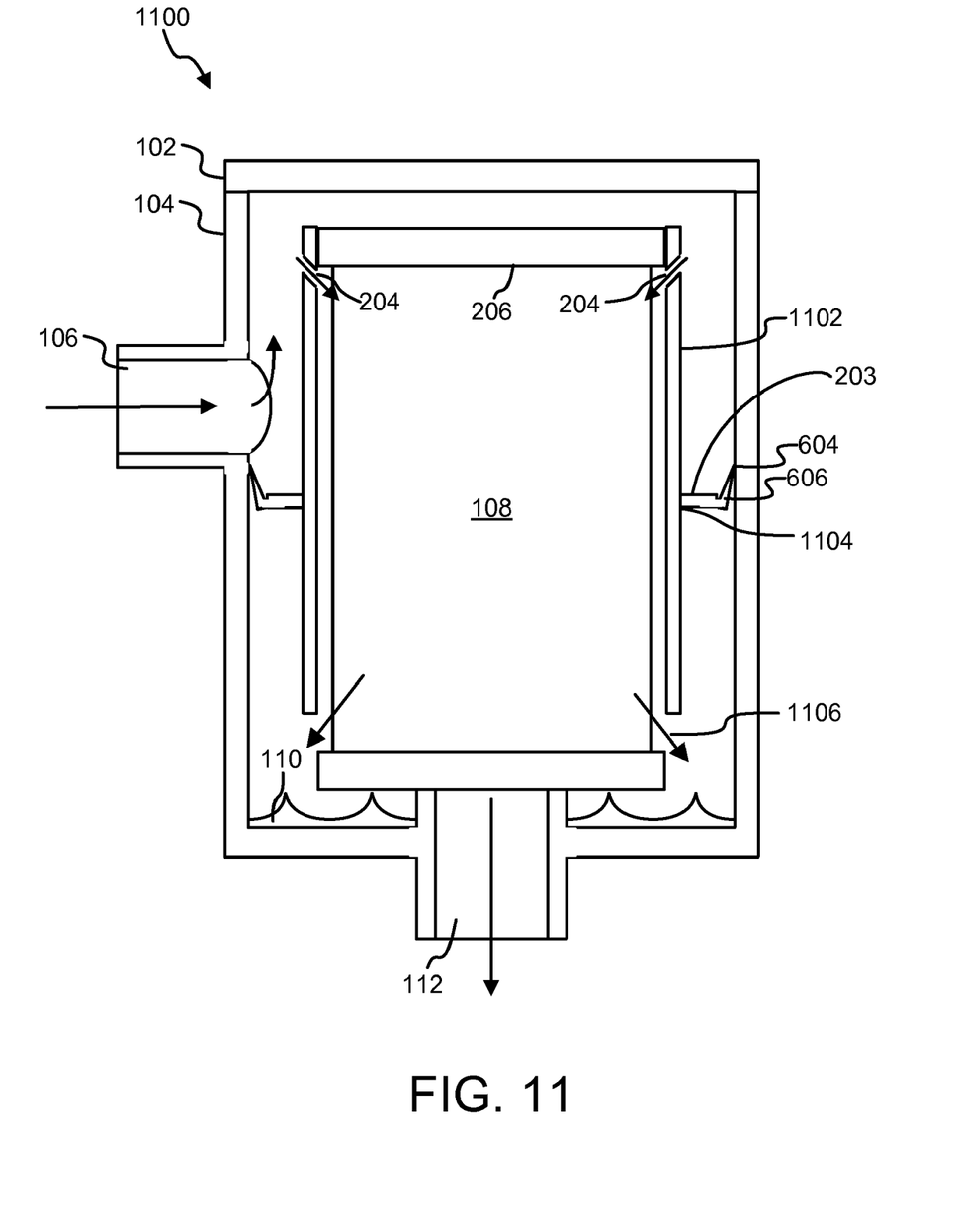
FIG. 11 is a cutaway front view of another embodiment of a fuel-water separator with an element housing according to the present invention.

FIG. 11 illustrates another embodiment of a fuel-water separator 1100 according to the present invention. The fuel-water separator 1100 includes a housing lid 102, a main housing 104, a fuel inlet 106, a flow diverter 202, a wrap-type element housing 1102 with holes 204, a filter element 108, a sump 110, and a fuel outlet 112. The housing lid 102, main housing 104, fuel inlet 106, filter element 108, sump 110, fuel outlet 112 and holes 204 are preferably configured in a manner similar to like numbered components described above in relation to FIG. 6.

The filter element 108 is surrounded by the wrap-type element housing 1102. The element housing 1102 has holes 204 to direct the flow of fluid in the fuel-water separator 1100, and may be constructed integral with or independent from the filter element 108 of any sufficiently impermeable material, including plastic, steel, aluminum, cellulose, cardboard, or paper.

In the embodiment shown, the element housing 1102 extends from a top endcap 206 of the filter element 108 to a point past the flange 203 and above the bottom of the filter element 108. An annular gap 1106 is formed between the bottom of the element housing 1102 and the bottom of the filter element 108. Water exits the filter element 108 through this annular gap 1106.

In an alternative embodiment, the element housing 1102 extends the length of the filter element 108 and includes one or more water drainage holes disposed near the bottom of the element housing 1102. Water exits the filter element 108 through the water drainage holes. The element housing 1102 includes an interface 604 with the main housing.

Figure 12:
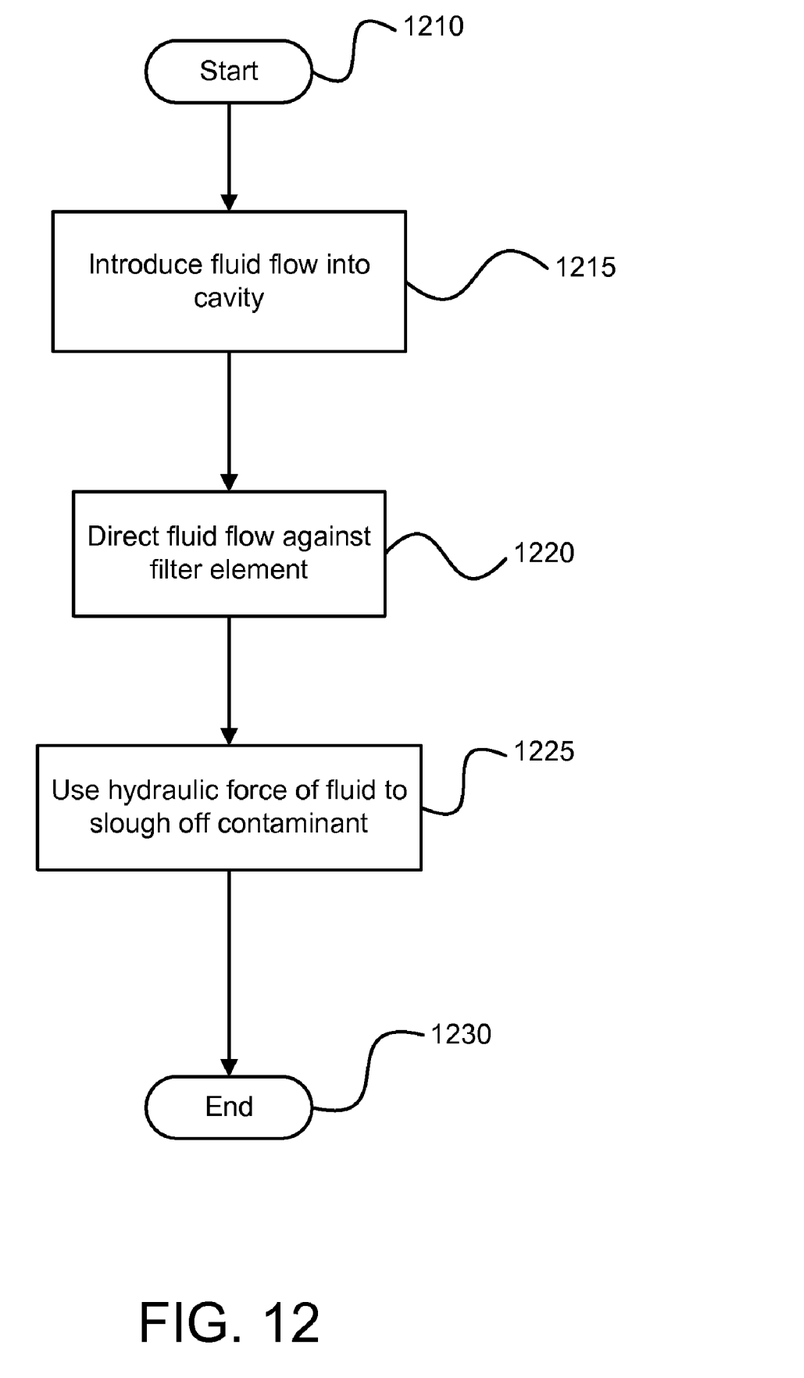
FIG. 12 is a schematic flow chart diagram illustrating an embodiment of a method of removing fluid contaminant according to the present invention.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 12 is a schematic flow chart diagram illustrating an embodiment of a method 1200 of removing fluid contaminant according to the present invention. The method may be used to remove water from a fuel filter element. The method 1200 begins as depicted in block 1210, and a flow of contaminated fluid, such as fuel containing water, is introduced into a cavity or chamber, block 1215. The fluid flow is directed against a filter element, block 1220. In one embodiment, the fluid flow is directed through a flow director, which may comprise one or more holes in a filter element housing as described above, and may be directed at least partially parallel to a surface of the filter element. The hole may be disposed at or near the top of the filter element. Hydraulic force resulting from the directed fluid flow is used to slough off contaminant from the filter element, block 1225, and the method ends, 1230.

Directing a fluid flow partially parallel to the filter element surface may include in some embodiments directing it near the top of the filter element completely horizontally, since clogging of the filter in that area will force the flow downward. Alternatively, an impermeable barrier may be placed at the top of the filter element to force the flow downward. The same concept may be used in reverse at the bottom of the filter element.

The present invention may be embodied in other specific forms without departing from its spirit or essential characteristics. For example, in one embodiment the element housing may be dispensed with entirely by giving the main inlet a downward direction. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A filter apparatus comprising:
 a main housing;
 a cavity and a filter element housing disposed within the main housing;
 an inlet disposed in the main housing, the inlet configured to introduce a flow of fluid containing a contaminant into the cavity outside of the filter element housing;
 a filter element disposed in the filter element housing, the filter element configured to allow the fluid to flow through the filter element while disallowing the contaminant from flowing through the filter element, resulting in the contaminant remaining on the filter element;
 a flow director configured to direct the flow of fluid from the cavity into the filter element housing to hydraulically remove the contaminant from the filter element, wherein the flow director provides a pathway that directs fluid to the filter element at approximately a top of the filter element;
 an annular space disposed between the filter element and the filter element housing; and
 a flange extending radially away from a bottom portion of the filter element housing to the main housing and configured to prevent unfiltered fluid from passing through the filter element without first passing through the flow director, the flange including a flange seal disposed on an end of the flange and configured to seal against the main housing.

2. The apparatus of claim 1, wherein the filter apparatus comprises a fuel filter.

3. The apparatus of claim 1, wherein the filter apparatus comprises a top-loading filter apparatus.

4. The apparatus of claim 1, wherein the flow director is configured to direct the flow of fluid at least partially parallel to a surface of the filter element.

5. The apparatus of claim 1, wherein the filter element housing is disposed in sealing engagement between the filter element and the main housing, and wherein the flow director comprises a hole in the filter element housing.

6. The filter apparatus of claim 1, wherein the filter element housing prevents fluid from accessing the filter element below the flow director.

7. A fuel filter system comprising:
 a filter apparatus including:
  a main housing;
  a cavity and a filter element housing disposed within the main housing;
  an inlet disposed in the main housing, the inlet configured to supply a flow of fuel containing a contaminant into the cavity;
  a cylindrical filter element disposed within the filter element housing, the filter element configured to filter the fuel flowing from the inlet such that the fuel flows through the filter element and the contaminant remains on a surface of the filter element;
  an annular space disposed between the filter element and the filter element housing;
  a hole disposed in the filter element housing, the hole configured to provide a pathway and that directs the flow of fuel against and at least partially parallel to the filter element surface such that the contaminant is sloughed off the filter element surface; and
  a flange extending radially away from a bottom portion of the filter element housing to the main housing and configured to prevent unfiltered fluid from passing through the filter element without first passing through the hole, the flange including a flange seal disposed on an end of the flange and configured to seal against the main housing.

8. The system of claim 7, wherein the contaminant is water.

9. The system of claim 7, wherein the hole comprises a plurality of holes disposed in annular arrangement in the filter element housing.

10. The system of claim 9, wherein the holes are disposed approximately at the top of the filter element housing.

11. The system of claim 9, wherein the holes are configured to direct the flow of fuel downward past the filter element surface.

12. The system of claim 9, wherein the holes are configured to direct the flow of fuel diagonally against the surface of the filter element.

13. The system of claim 9, wherein the holes are configured to direct the flow of fuel horizontally against the surface of the filter element, further comprising an at least partial blockage of the filter element at a location of the holes, forcing the flow of fuel at least partially downward past the surface of the filter element.

14. The system of claim 9, wherein the filter element is pleated and wherein each hole corresponds to a pleat.

15. The system of claim 7, wherein the element housing has a closed top and an open bottom, with the filter element housing enclosing a top portion of the filter element.

16. The system of claim 7, wherein the filter element has a top end cap, and wherein the filter element housing has an open top and an open bottom, with a top edge of the element housing abutting the top end cap.

17. The system of claim 16, wherein the hole comprises a space between a top edge of the filter element housing and the top end cap.

18. The system of claim 7, wherein the filter element has a top end cap, and wherein the filter element housing is integral with the top end cap.

19. The system of claim 7, wherein the cavity is approximately cylindrical.

20. The system of claim 19, wherein the flange seal is a flexible lip.

21. The system of claim 19, wherein the flange seal is a gasket.

22. The system of claim 19, wherein the flange seal is an O-ring seal.

23. The system of claim 19, wherein the flange is disposed above a lower end of the filter element.

* * * * *